United States Patent Office 2,848,211
Patented Aug. 19, 1958

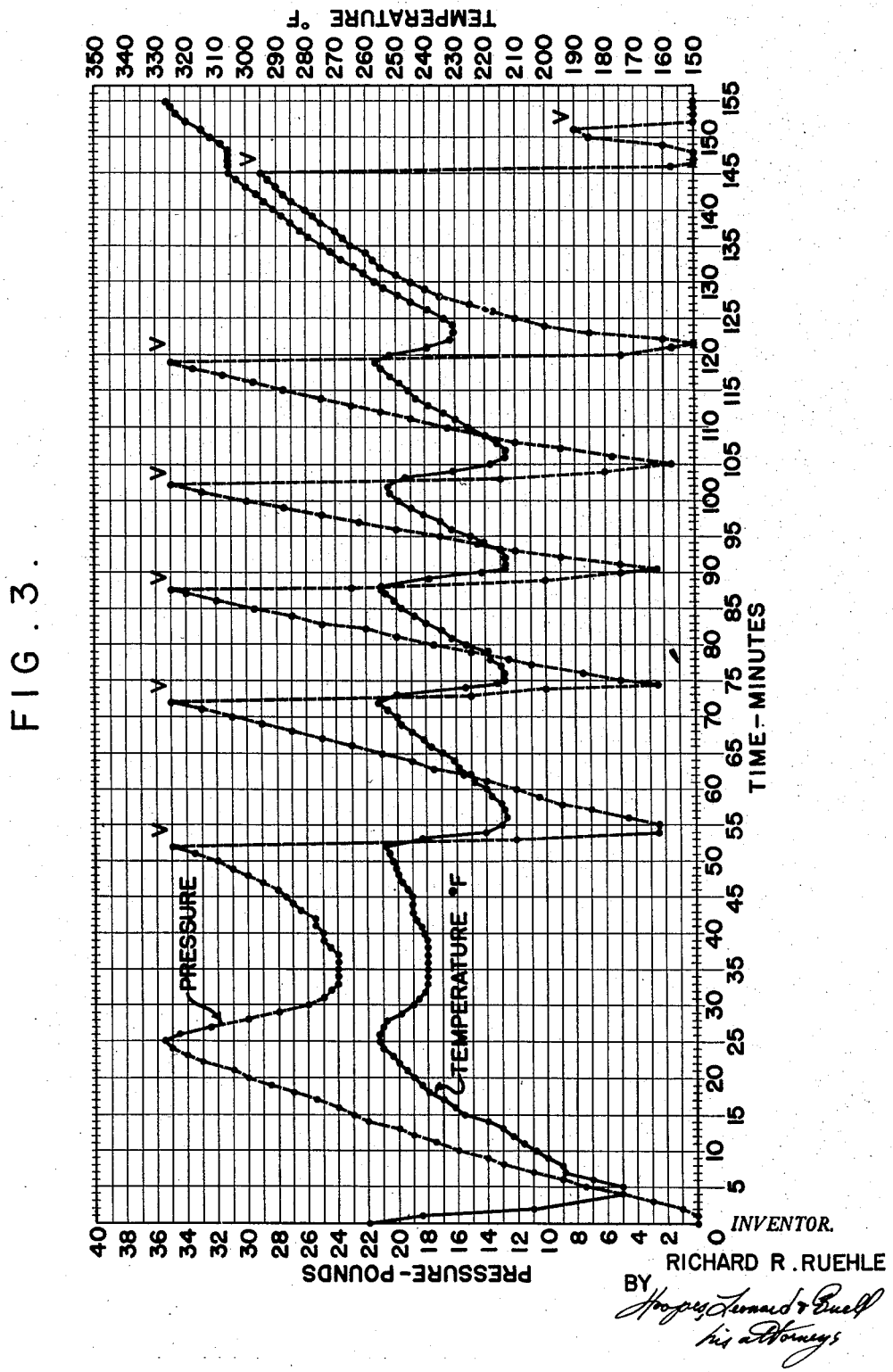

2,848,211

DEHYDRATING GYPSUM OR THE LIKE

Richard R. Ruehle, Clarksburg, W. Va., assignor to Charles E. Compton, Bridgeport, W. Va.

Application January 9, 1956, Serial No. 558,046

9 Claims. (Cl. 263—53)

This invention relates to dehydrating gypsum or the like and more particularly to a method of dehydrating gypsum or the like whereby a superior product may be produced from relatively low grade raw material at high efficiency and high speed.

In copending applications Serial Nos. 423,781 and 423,805, filed April 16, 1954, there are disclosed a dehydrating apparatus and method in which a rotary dehydrating drum is employed, the drum having separate compartments or chambers for the gypsum or the like being dehydrated and the source of heat used to effect the dehydration of the gypsum or the like and having controllable means for venting the first mentioned compartment or chamber.

My improved method of dehydrating gypsum or the like may be carried out utilizing the apparatus disclosed in said copending applications or utilizing other apparatus in which the gypsum or the like being dehydrated is segregated from the source of heat and control means are provided for venting the chamber in which the gypsum or the like being dehydrated is disposed.

In my method of dehydrating gypsum or the like I introduce into a dehydrating chamber a mass of pieces of gypsum or the like, substantially seal the mass of pieces of gypsum or the like in the dehydrating chamber, apply heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately vent and seal the dehydrating chamber and thereby cause the pressure in the dehydrating chamber to alternately rise and fall until the gypsum or the like is substantially dehydrated to calcium sulphate hemihydrate ($CaSO_4 \cdot \frac{1}{2} H_2O$). The heat may be applied from any suitable source of heat, as, for example, a gas, oil or powdered coal burner. When apparatus as above referred to is employed the flame from the burner may enter axially a rotating dehydrating drum, the products of combustion entering one compartment or chamber in the drum while the gypsum or the like being dehydrated is disposed in another compartment or chamber. I preferably provide means for separating the mass of pieces of gypsum or the like into relatively small semi-isolated portions lying against the dividing wall between the two chambers in the rotating dehydrating drum so that heat is rapidly and efficiently transferred from the heating chamber through the dividing wall by conduction into the dehydrating chamber, the rotation of the drum causing the pieces of gypsum or the like to tumble and change their position, thus further promoting thermal efficiency of the process.

An important aspect of my method is the control of venting of the dehydrating chamber. That chamber is preferably provided with one or more valves leading to the outside atmosphere which may be opened and closed at will. I find it desirable to employ three valves equally spaced apart about 120° about the circumference of the drum as disclosed in said copending applications. Means may be provided for opening and closing the valves pursuant to manual operation. For example, the valves may be urged closed by springs and may be opened against the spring action by a shoe or cam whose position may be changed by means of a screw or otherwise as disclosed in said copending applications.

I preferably alternately vent and seal the dehydrating chamber and thereby cause the pressure in the dehydrating chamber to alternately rise and fall until with the dehydrating chamber sealed a relatively great period of time is required to raise the pressure to a point below the maximum pressure attained during earlier periods during which the dehydrating chamber was sealed; that is an indication that the gypsum or the like is substantially dehydrated. I may alternately vent and seal the dehydrating chamber and thereby cause the pressure and temperature in the dehydrating chamber to alternately rise and fall until upon venting of the dehydrating chamber the temperature therein does not substantially fall.

It is preferable to apply heat to the mass of pieces of gypsum or the like by conduction through the wall of the dehydrating chamber while the mass of pieces of gypsum or the like remains sealed in the dehydrating chamber until the pressure in the dehydrating chamber rises to a maximum and then drops and rises again and thereafter, while continuing to supply heat to the mass of pieces of gypsum or the like by conduction through the wall of the dehydrating chamber, alternately vent the dehydrating chamber when the pressure reaches substantially a predetermined pressure and seal the dehydrating chamber and thereby cause the pressure in the dehydrating chamber to alternately rise and fall until the gypsum or the like is substantially dehydrated. The predetermined pressure may be the maximum pressure referred to in the preceding paragraph.

I desirably alternately vent and seal the dehydrating chamber and thereby cause the pressure and temperature in the dehydrating chamber to alternately rise and fall until with the dehydrating chamber sealed and with the pressure in the dehydrating chamber below the maximum pressure attained during earlier periods during which the dehydrating chamber was sealed the temperature in the dehydrating chamber rises to a temperature substantially above the temperature at which the dehydrating chamber had previously been vented.

The dehydrating chamber may be alternately vented when the pressure therein reaches substantially a predetermined pressure and sealed whereby to cause the pressure in the dehydrating chamber to alternately rise and fall until with the dehydrating chamber sealed the pressure in the dehydrating chamber does not rise to said predetermined pressure. During the dehydrating process the temperature in the dehydrating chamber is preferably maintained high enough to prevent condensation of steam in the dehydrating chamber.

In a preferred procedure I alternately vent the dehydrating chamber when the pressure reaches a pressure substantially in the range of 30–40 pounds per square inch gauge and seal the dehydrating chamber and thereby cause the pressure in the dehydrating chamber to alternately rise and fall until with the dehydrating chamber sealed the pressure in the dehydrating chamber does not rise substantially above 30 pounds per square inch gauge. Desirably the dehydrating chamber is alternately vented and sealed whereby the temperature in the dehydrating chamber is caused to alternately rise and fall while the temperature therein is maintained in the range 212–275° F. until the gypsum or the like is substantially dehydrated to calcium sulphate hemihydrate, when with the dehydrating chamber open to the atmosphere the temperature therein is raised substantially above said range to finally dry the dehydrated gypsum or the like.

Other details, objects and advantages of the invention will become apparent as the following description of a present preferred method of practicing the same proceeds.

In the accompanying drawings I have illustrated a present preferred method of practicing the invention and have shown one form of apparatus which may be employed in which Figure 1 is a side view of apparatus for dehydrating gypsum or the like with portions cut away and portions in section;

Figure 3 is a graph plotting time against pressure (broken line) and against temperature (solid line) in my method of dehydrating gypsum or the like.

Figure 1:
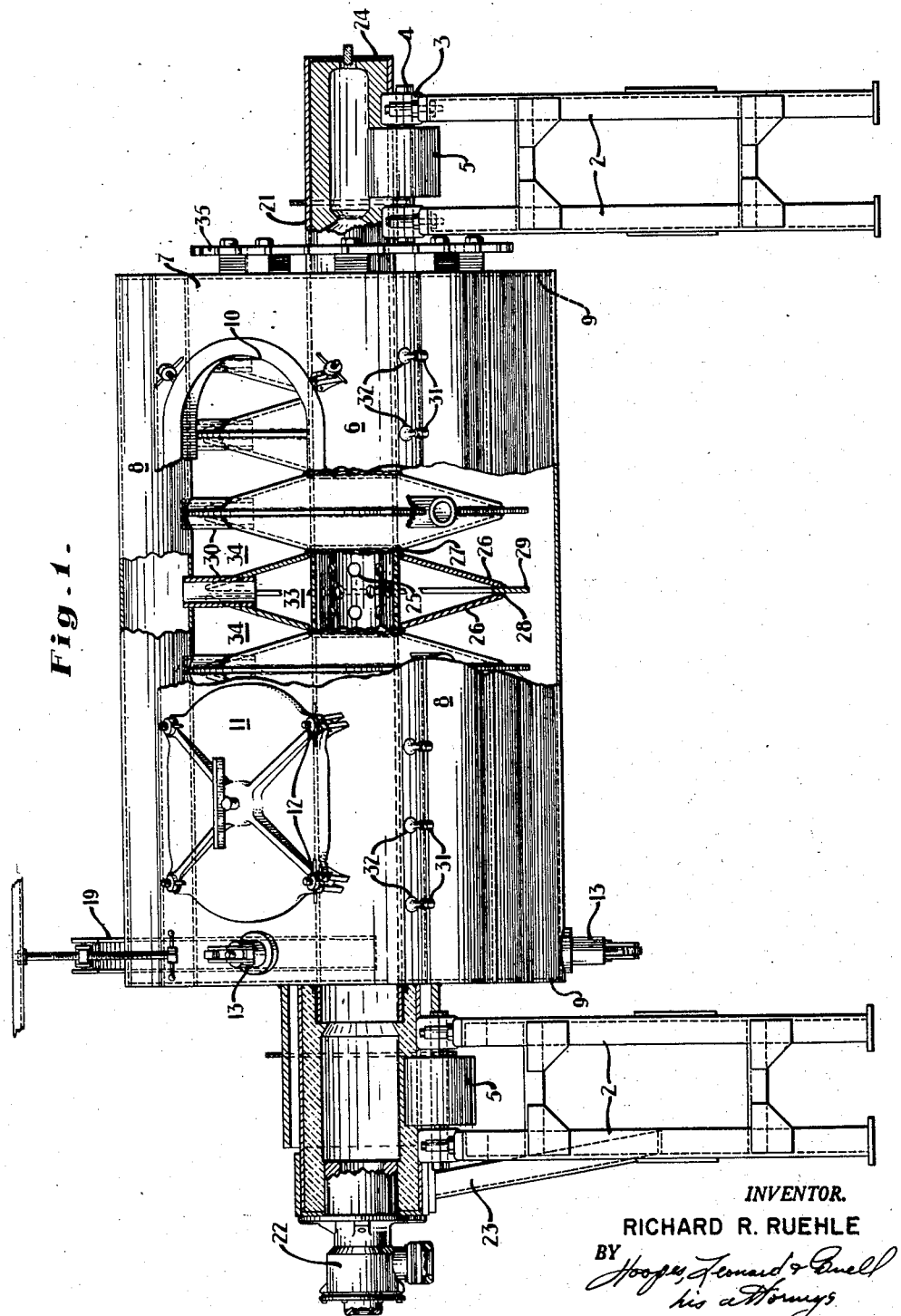
Figure 2:
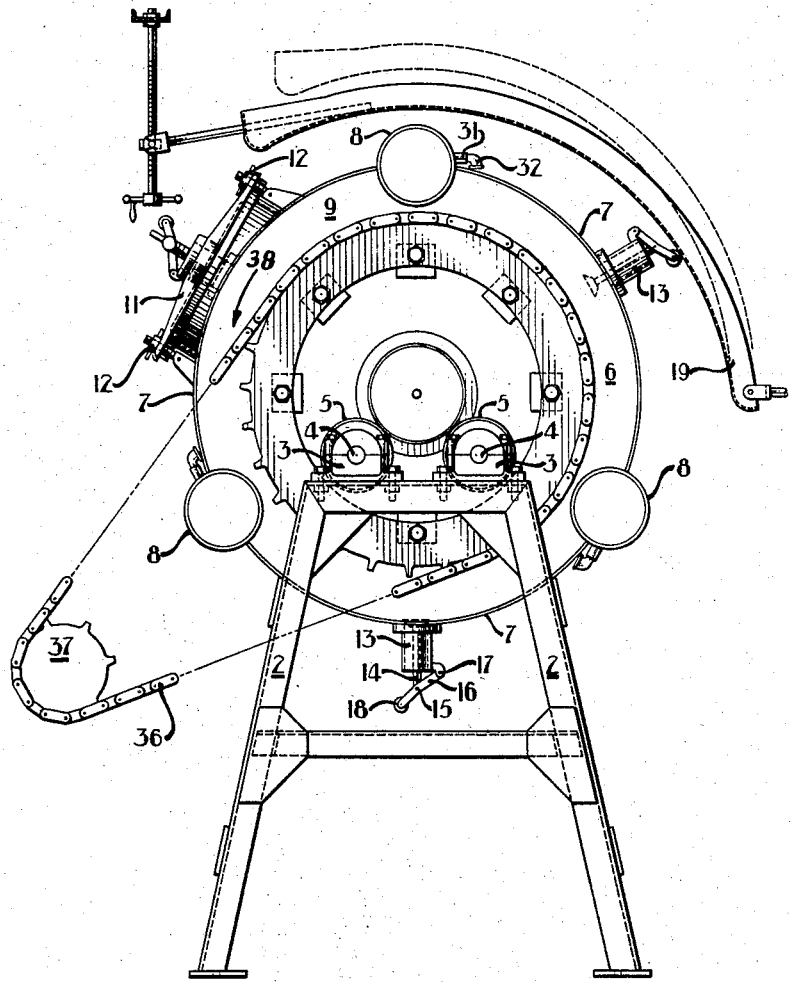
Figure 2 is an end view of the apparatus shown in Figure 1.

The apparatus disclosed herein is the same apparatus as is disclosed in said copending applications; indeed, Figures 1 and 2 are copied therefrom. The apparatus shown in the drawings comprises two pedestals 2 each carrying bearings 3 rotatably supporting shafts 4 each carrying a supporting roller 5. There are two rollers 5 on each pedestal 2, the rollers of the respective pedestals forming drum supporting crotches which are in line longitudinally of the apparatus.

The dehydrating drum is designated generally by reference numeral 6. It comprises a generally cylindrical shell made up of curved single thickness metal portions 7 and tubes 8, the particular drum 6 shown in the drawings having three portions 7 and three tubes 8. The portions 7 and tubes 8 are connected together to form the generally cylindrical shell, as, for example, by welding. Each of the tubes 8 consequently constitutes a portion of the shell with part of the outside surface of the tube exposed inwardly and part exposed outwardly of the shell. Strengthening plates or struts not shown in the drawings may be provided for adding structural strength to the shell as may be deemed necessary or desirable or dictated by principles of structural design well known to those skilled in the art.

The dehydrating drum 6 has end plates 9 applied to and closing the shell at its ends. The drum has two lateral openings 10 through which a mass of pieces of gypsum or the like may be introduced for dehydrating and through which the dehydrated gypsum or the like may be dumped out at the end of the dehydrating process. Each of the openings 10 is provided with a removable closure member 11 and clamping means 12 of any suitable construction for clamping the closure member to the drum to close the corresponding openings 10. Sealing gaskets may be provided for sealing the closure members 11 about the openings 10 to make the drum steam-tight. The drum is provided with three circumferentially spaced relief valves 13 for relieving the steam pressure therewithin, each of the valves 13 having a stem 14 pivoted at 15 to a lever 16 pivoted at 17 to the valve casing and carrying a roller 18 adapted upon rotation of the drum 6 to be engaged by a valve operating cam 19 mounted beside the drum as shown for adjustment toward and away from the drum to cause opening of each relief valve to a desired extent and for a desired portion of the angular turning movement of the drum. Such a relief valve arrangement is not new and is not claimed by me as inventive.

A pipe 21 is provided which passes through the drum 6 and is substantially coaxial therewith and projects beyond both ends of the drum. Central openings for receiving the pipe 21 are provided in the end plates 9 of the drum and the end plates are preferably welded to the pipe 21 about those openings. Thus the drum 6 is supported by the pipe 21 through the drum end plates 9. The projecting ends of the pipe 21 seat in the drum supporting crotches formed by the rollers 5 so that the drum may be rotated about the axis of the pipe.

The left-hand end of the pipe 21 viewing Figure 1 is open and means are provided for introducing heating medium thereinto. In the form shown in the drawings I provide a gas burner 22 mounted on a stand 23 carried by the left-hand pedestal 2 viewing Figure 1. The gas burner delivers a blast of hot products of combustion into the pipe 21 from the left-hand end thereof moving toward the right viewing Figure 1. The right-hand end of the pipe 21 is closed by a closure cap 24. Within the drum 6 the pipe 21 is provided with perforations 25. The perforated portion of the pipe 21 preferably extends throughout at least the major portion of the length of the drum. Disposed about the perforated portion of the pipe 21 within the drum 6 is an annular accordion-like structure made up of annular plates 26 welded together at 27 and at 28. Where the plates 26 are joined at 28 an annular plate 29 is welded to them and projects generally radially as shown in Figure 1. Three connecting tubes 30 are in communication with the internal space between each opposed pair of plates 26 and are welded thereto and also communicate with the respective tubes 8 and are welded thereto whereby to form a sealed passage for products of combustion from the interior of the pipe 21, outwardly between plates 26, through the connecting tubes 30 and through the tubes 8. Each tube 8 is provided with a normally open exhaust passage 31 terminating in an elbow 32 so that the products of combustion passing out therethrough are directed against one of the portions 7 of the shell as shown in Figure 2, thereby heating the drum exteriorly. The accordion-like structure made up of the plates 26 and 29 and the connecting tubes 30 may expand and contract relatively to the drum due to temperature changes. The plates 26 of the accordion-like structure form internal pockets 33 which are in communication with the interior of the pipe 21 through the perforations 25 and external pockets 34 in which the gypsum or the like being dehydrated lies. The external pockets 34 substantially divide the mass of pieces of gypsum or the like into semi-segregated smaller masses of pieces to which heat from the products of combustion from the burner 22 is conducted both at the inner annular faces and at the opposite side faces thereof.

A ring gear or sprocket 35 is applied to the right-hand end plate 9 of the drum as shown in Figure 1. The drum may be rotated by any suitable driving means acting upon the ring gear or sprocket, such, for example, as a sprocket chain indicated by the chain line 36 in Figure 2 and driven by a sprocket indicated diagrammatically by the circle 37 which may derive its power from any suitable source. The direction of turning of the drum is as indicated by the arrow 38 in Figure 2.

The dehydrating operation is a batch operation. At the beginning of a batch or cycle the drum is empty. It is positioned with the openings 10 upwardly and a mass of pieces of gypsum or the like to be dehydrated is introduced into the drum through the openings 10. The pieces of gypsum or the like may be of varied sizes, normally ranging from pieces having a maximum dimension of an inch or two down to relatively fine particle size. The drum is largely filled with pieces of gypsum or the like so that the mass of pieces of gypsum or the like extends well above the top of the pipe 21 and preferably to at least about the level of the tops of the plates 26. The drum is filled full enough to avoid unnecessary waste space in it during the dehydrating operation but not so full that the pieces of gypsum or the like are packed tightly in the drum. Provision is thus made for substantial relative movement between the pieces of gypsum or the like during rotation of the drum.

After the mass of pieces of gypsum or the like has been introduced into the drum the closure members 11 are applied to and sealed about the openings 10 and the gas burner 22 is set in operation and the rotation of the drum is commenced. The drum may be rotated at various speeds, a speed of about six to twelve revolutions per minute being found satisfactory. As the drum rotates the pieces of gypsum or the like are tumbled therewithin but are substantially divided into semi-segregated masses in the pockets 34. The products of combustion from the burner 22 pass from left to right viewing Figure 1 through the pipe 21 and thence annularly outwardly through the perforations 25, the pockets 33, the connecting tubes 30, the tubes 8 and the exhaust passages 31 to the outside of the drum. Thus the passage for the products of combustion is open and the flow of products of combustion through the apparatus is continuous. The products of combustion heat the pieces of gypsum or the like in the pockets 34 by conduction through the plates 26 at the inner annular faces and at the opposite side faces of the semi-segregated masses of gypsum or the like in those pockets. The arrangement is such that unprecedented thermal efficiency is obtained. At the same time it is unnecessary to provide a steam-tight chamber for the heating medium.

It is desirable to preheat the drum before introducing gypsum or the like to be dehydrated. This is done by starting operation of the burner 22 with the drum empty but rotating. I desirably preheat the drum to a temperature of the order of 300° F., when the rotation of the drum is stopped and the drum is charged with gypsum or the like to be dehydrated. Then the drum is sealed and its rotation recommenced. When the relatively cold gypsum or the like is introduced into the preheated drum the temperature within the dehydrating chamber is reduced substantially. For example, Figure 3 shows that during the first four minutes of the dehydrating process the temperature within the dehydrating chamber drops sharply. During that time the relatively cold gypsum or the like in the drum is rapidly absorbing heat from the drum. A point is reached at which the temperature within the dehydrating chamber stops falling and begins to rise as shown at 4–5 minutes in Figure 3. The burner is kept on and the dehydrating chamber is kept sealed and both the pressure and the temperature in the dehydrating chamber rise for a substantial portion of an hour after which without changing the burner and while maintaining the dehydrating chamber sealed the pressure and temperature drop. This is shown in Figure 3 as occurring between twenty-five and thirty-three minutes after the beginning of the process. While I do not know the reason for the pressure and temperature drop I believe that it is caused by absorption by the gypsum or the like of steam formed in the dehydrating chamber from surface moisture as distinguished from the internal moisture of the gypsum. This is purely a theory and I wish it clearly understood that I am not bound by it as there may be some other explanation for the phenomenon. In any event, the pressure and temperature do drop from the maximum pressure of 35 to 36 pounds per square inch gauge and a maximum temperature of some 256° F. to a minimum pressure of about 24 pounds per square inch gauge and a minimum temperature of about 240° F. The minimum pressure and temperature may be reached roughly a half hour after commencement of the process; Figure 3 shows the minimum pressure and temperature occurring at thirty-three minutes after commencement of the process. Thereafter for several minutes the temperature and pressure remain substantially level after which they begin to rise.

I allow the pressure in the dehydrating chamber to build up until it reaches a predetermined pressure, preferably a pressure corresponding to a temperature well above the boiling point of water at atmospheric pressure but well below a temperature which, if the gypsum or the like were subjected to it for a prolonged period, might over-calcine the material. I vent the dehydrating chamber when the pressure reaches a pressure in the range 30–40 pounds per square inch gauge. In the process illustrated in Figure 3 I arbitrarily vented the dehydrating chamber when the pressure therein reached 35 pounds per square inch gauge. This was at 52 minutes. I have place the letter V on Figure 3 to indicate each venting of the dehydrating chamber. Immediately upon venting the pressure and temperature in the dehydrating chamber drop. I watched the thermometer and sealed the dehydrating chamber before the temperature dropped to 212° F. as the moisture in the dehydrating chamber should be maintained in the form of steam to avoid possible rehydration. The dehydrating chamber is vented by opening the valves 13 and sealed by closing the valves 13. The opening and closing of the valves is controlled by the cam 19 as above described.

After the dehydrating chamber has been sealed after the first venting thereof the process becomes cyclic. The burner is kept on and the temperature and pressure build up in the dehydrating chamber. Each time the pressure reaches 35 pounds per square inch gauge I vent the dehydrating chamber, being careful to reseal the dehydrating chamber before the temperature drops to 212° F. This cyclic operation continues until it is found that upon venting of the dehydrating chamber the gauge pressure in the chamber can be reduced to zero while the temperature remains well above 212° F. This is an indication that the dehydration is nearing completion. When the gauge pressure in the dehydrating chamber becomes zero the chamber is again sealed and the process continues. This time it will be found that it takes a relatively long time to increase the pressure in the dehydrating chamber and that the pressure will not rise to 35 pounds per square inch gauge while the temperature rises far above the temperatures previously recorded at the times of venting. When the temperature rises above about 300° F. the dehydrating chamber is again vented. The pressure in the dehydrating chamber drops rapidly to zero while the temperature remains substantially constant. This is an indication that the dehydration is substantially complete. I prefer to subject the dehydrated gypsum or the like to a final drying out step to make sure that substantially all free moisture has been driven off and I continue to apply heat until the temperature rises to within the range 320–340° F. The graph of Figure 3 shows that the pressure built up to a maximum of 8 pounds per square inch gauge when the temperature had risen to 315° F. At that time the dehydrating chamber was finally vented and the heat maintained for a few more minutes to finally dry out the dehydrated gypsum.

My process as above described may be somewhat varied as to temperature and pressure limits but I believe that the cyclic procedure as described should be followed for best results. I also believe that the dehydrating chamber should not be vented until after the initial high pressure and temperature have been reduced and the pressure and temperature have built up again as above described. The process requires between two and three hours and the product which I produce has an optimum proportion of calcium sulphate hemihydrate.

While I have described a present preferred method of practicing the invention and have illustrated one form of apparatus which may be employed in its practice it is to be distinctly understood that the invention is not limited thereto but may be otherwise variously practiced within the scope of the following claims.

I claim:

1. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber and sealing the dehydrating chamber for periods of at least several minutes during which the pressure in the dehydrating chamber builds up and thereby causing the pressure in the dehydrating chamber to alternately rise and fall until the gypsum or the like is substantially dehydrated to calcium sulphate hemihydrate.

2. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber and sealing the dehydrating chamber for substantial periods during which the pressure in the dehydrating chamber builds up at least about 30 pounds per square inch and thereby causing the pressure in the dehydrating chamber to alternately rise and fall until with the dehydrating chamber sealed a relatively great period of time is required to raise the pressure to a point below the maximum pressure attained during earlier periods during which the dehydrating chamber was sealed.

3. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber and sealing the dehydrating chamber for periods of at least several minutes during which the pressure in the dehydrating chamber builds up and thereby causing the pressure and temperature in the dehydrating chamber to alternately rise and fall until upon venting of the dehydrating chamber the temperature therein does not substantially fall.

4. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber until the pressure in the dehydrating chamber rises to a maximum and then drops and rises again and thereafter, while continuing to supply heat to the mass of pieces of gypsum or the like by conduction through the wall of the dehydrating chamber, alternately venting the dehydrating chamber when the pressure reaches substantially a predetermined pressure at least about 30 pounds per square inch gauge and sealing the dehydrating chamber and thereby causing the pressure in the dehydrating chamber to alternately rise and fall until the gypsum or the like is substantially dehydrated to calcium sulphate hemihydrate.

5. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber and sealing the dehydrating chamber for periods of at least several minutes during which the pressure in the dehydrating chamber builds up at least about 30 pounds per square inch and thereby causing the pressure and temperature in the dehydrating chamber to alternately rise and fall until with the dehydrating chamber sealed and with the pressure in the dehydrating chamber below the maximum pressure attained during earlier periods during which the dehydrating chamber was sealed the temperature in the dehydrating chamber rises to a temperature substantially above the temperature at which the dehydrating chamber had previously been vented.

6. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber when the pressure reaches substantially a predetermined pressure of the order of 35 pounds per square inch gauge and sealing the dehydrating chamber and thereby causing the pressure in the dehydrating chamber to alternately rise and fall until with the dehydrating chamber sealed pressure in the dehydrating chamber does not rise to said predetermined pressure.

7. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remain sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber when the pressure reaches a pressure substantially in the range 30–40 pounds per square inch gauge and sealing the dehydrating chamber and thereby causing the pressure in the dehydrating chamber to alternately rise and fall until with the dehydrating chamber sealed the pressure in the dehydrating chamber does not rise substantially above 30 pounds per square inch gauge.

8. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber when the pressure reaches substantially a predetermined pressure of the order of 30–40 pounds per square inch gauge and sealing the dehydrating chamber and thereby causing the pressure in the dehydrating chamber to alternately rise and fall until with the dehydrating chamber sealed the pressure in the dehydrating chamber does not rise to said predetermined pressure, and during said procedure maintaining the temperature in the dehydrating chamber high enough to prevent condensation of the steam in the dehydrating chamber.

9. A method of dehydrating gypsum or the like comprising introducing into a dehydrating chamber a mass of pieces of gypsum or the like, substantially sealing the mass of pieces of gypsum or the like in the dehydrating chamber, applying heat to the mass of pieces of gypsum or the like by conduction through the wall of the dehydrating chamber while the mass of pieces of gypsum or the like remains sealed in the dehydrating chamber, resulting in driving off moisture from the pieces of gypsum or the like and forming steam in the dehydrating chamber, and, while continuing to apply heat to the mass of pieces of gypsum or the like by conduction through the wall of the dehydrating chamber, alternately venting the dehydrating chamber and sealing the dehydrating chamber for periods of at least several minutes during which the pressure in the dehydrating chamber builds up and thereby causing the temperature in the dehydrating chamber to alternately rise and fall while maintaining said temperature substantially in the range 212–275° F. until the gypsum or the like is substantially dehydrated to calcium sulphate hemihydrate and then with the dehydrating chamber open to the atmosphere raising the temperature therein substantially above said range to finally dry the dehydrated gypsum or the like.

References Cited in the file of this patent

UNITED STATES PATENTS

| | | |
|---|---|---|
| 781,747 | Simonds | Feb. 7, 1905 |
| 1,967,029 | Karrick et al. | July 17, 1934 |
| 2,290,805 | Gottschalk et al. | July 21, 1942 |
| 2,479,576 | Karrick | Aug. 23, 1949 |

UNITED STATES PATENT OFFICE
CERTIFICATE OF CORRECTION

Patent No. 2,848,211                                            August 19, 1958

Richard R. Ruehle

It is hereby certified that error appears in the printed specification of the above numbered patent requiring correction and that the said Letters Patent should read as corrected below.

Column 6, line 8, after the word "was" insert -- done --.

Signed and sealed this 28th day of October 1958.

(SEAL)
Attest:
KARL H. AXLINE                                              ROBERT C. WATSON
Attesting Officer                                       Commissioner of Patents